No. 699,304. Patented May 6, 1902.
V. GEBHARDT.
FISHING BAIT HOLDER.
(Application filed Nov. 11, 1901.)
(No Model.)

Witnesses
Otto J. Krieg
Richard L. Gebhardt

Victor Gebhardt
Inventor

UNITED STATES PATENT OFFICE.

VICTOR GEBHARDT, OF ST. LOUIS, MISSOURI.

FISHING-BAIT HOLDER.

SPECIFICATION forming part of Letters Patent No. 699,304, dated May 6, 1902.

Application filed November 11, 1901. Serial No. 81,879. (No model.)

*To all whom it may concern:*

Be it known that I, VICTOR GEBHARDT, a citizen of the United States, residing in the city of St. Louis, State of Missouri, have invented certain new, novel, and useful Improvements in Combination Fish-Hooks and Minnow-Holders; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new, novel, and useful improvements in fishing appliances, and it relates more particularly to the provision of a simple and efficient device for holding live minnows and small fish, such as are commonly used by anglers in casting, trolling, and in still-fishing.

To these ends and to such others as the invention may pertain the same consists in the novel, new, and peculiar construction of my live-minnow holder attached to a double diverging fish-hook, as shown in the accompanying drawings and specifically defined in the appended claims.

The invention is clearly illustrated in the accompanying drawings, which, with the letters of reference marked thereon, form a part of this specification, and in which drawings—

Figure 1:
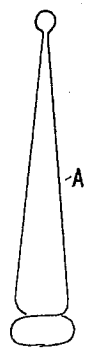
Figure 2:
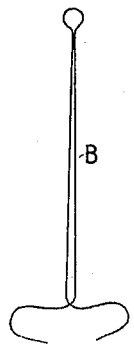
Figure 3:
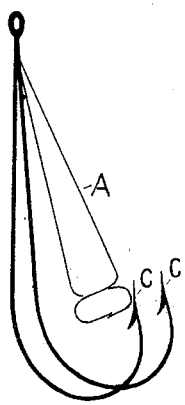
Figure 4:
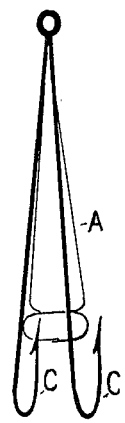
Figure 5:
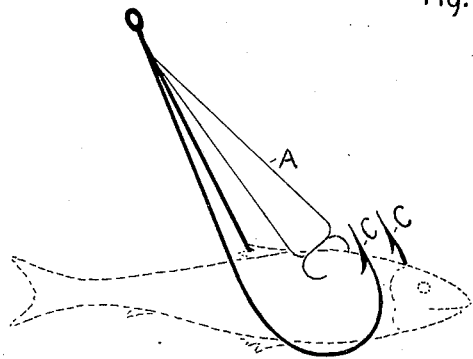

Figure 1 is an enlarged perspective front view of my live-minnow holder in natural form and position separate and independent of a fish-hook. Fig. 2 is an enlarged perspective front view of my live-minnow holder as it appears when spring-actuated and open separate and independent of a fish-hook. Fig. 3 is a perspective side view of my live-minnow holder attached and secured to a double diverging fish-hook. Fig. 4 is a perspective front view of my live-minnow holder attached and secured to a double diverging fish-hook. Fig. 5 is a perspective side view of my live-minnow holder attached and secured to a double diverging fish-hook with a live minnow in position for fishing.

Reference now being had to the drawings in detail, A designates my live-minnow holder, as shown in Figs. 1, 3, 4, and 5 of the drawings. This holder consists of a plurality of diverging sides or members extending toward the barbed ends of the fish-hook, near which ends the members of the bait-holder are bent toward each other and cross centrally between the planes of said barbed ends and are then bent reversely and terminate in bait-engaging hooks. Said members of the bait-holder are adapted to be pressed by the fingers of a user between the attached end of the members and the crossing of the members, so that pressure may separate the hooks to allow insertion of bait.

B designates my live-minnow holder when spring actuated and open, as shown in Fig. 2 of the drawings.

C C designate the double diverging fish-hook, as shown in Figs. 3, 4, and 5 of the drawings.

My minnow-holder should be made of fine spring-steel wire capable of being finely tempered to produce the desired spring and secured at the eye end of the fish-hook by a suitable metal fastening, as an eyelet.

A very few words will suffice to make clear to any one at all familiar with fishing appliances and the habits of fish (more particularly game fish) that my minnow-holder is most simple in construction, usage, and efficacy, and withal attractive. It may advantageously be combined with any style of fish hook or hooks, and the hook or hooks used may be covered with angle-worms without interfering with the free and natural action of a live minnow on the holder. It is also obvious that my live-minnow holder is equally efficient for the use of liver, dough-bait, cheese, or any other of the various kinds of bait known to anglers.

Any live bait may be attached to or released from my minnow-holder by a simple pressure of the fingers on the arms of the same.

I am aware that prior to my invention bait-holders have been made having an eye and arms provided with projecting points. Hence I do not claim such a combination, broadly; but What I do claim as my invention, and desire to secure by Letters Patent, is—

1. The combination with a fish-hook having a plurality of shanks joined at the line-attaching end of the hook, and separate barbed ends, of a bait-holder secured to the fish-hook at its line-attaching end, and consisting of a plurality of members extending toward said barbed ends, said members being bent to cross each other, bent reversely to form bait-engaging hooks, and the members being adapted to be pressed together, whereby the bait-hooks near the barbed fish-hook ends are separated to allow insertion of bait.

2. The combination with a fish-hook, of a bait-holder secured to the fish-hook at its line-attaching end, and consisting of a plurality of members extending toward the barbed end of the fish-hook, said members being bent to cross each other, bent reversely to form bait-engaging hooks, and the members being adapted to be pressed together, whereby the bait-hooks, near the barbed end of the fish-hook, are separated to allow insertion of bait.

In testimony whereof I have signed my name to this specification in the presence of two subscribing witnesses.

VICTOR GEBHARDT.

Witnesses:
    OTTO J. KING,
    RICHARD L. GEBHARDT.